(12) United States Patent
Gooden et al.

(10) Patent No.: US 8,177,648 B2
(45) Date of Patent: May 15, 2012

(54) LUBRICANT CIRCUIT INCLUDING A CAP PLUG

(75) Inventors: James T. Gooden, Canton, MI (US);
Ronald V. Cornacchia, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 143 days.

(21) Appl. No.: 12/838,528

(22) Filed: Jul. 19, 2010

(65) Prior Publication Data

US 2012/0015749 A1    Jan. 19, 2012

(51) Int. Cl.
*F16C 1/24* (2006.01)
*F16H 57/04* (2010.01)

(52) U.S. Cl. ............................................. 464/7; 74/467

(58) Field of Classification Search ............... 464/7, 16, 464/183; 184/14; 74/467, 606 R; 366/340; 475/159; 285/94
See application file for complete search history.

(56) References Cited

U.S. PATENT DOCUMENTS

| 3,677,525 | A | * | 7/1972 | Schurig et al. ............... 366/340 |
| 3,785,458 | A | * | 1/1974 | Caldwell et al. .............. 74/467 |
| 3,990,538 | A | * | 11/1976 | Casey et al. .................... 464/16 |
| 4,480,493 | A | * | 11/1984 | Takahashi ..................... 74/467 |
| 5,025,683 | A | | 6/1991 | Lewis |
| 5,131,498 | A | | 7/1992 | Kato et al. |
| 5,667,036 | A | * | 9/1997 | Mueller et al. ................ 74/467 |
| 6,279,422 | B1 | | 8/2001 | Moll |
| 2008/0098981 | A1 | | 5/2008 | Estacio et al. |
| 2009/0139370 | A1 | * | 6/2009 | Sugiura et al. ............. 74/606 R |

FOREIGN PATENT DOCUMENTS

| JP | 56042752 A | 4/1981 |
| JP | 60081595 A | 5/1985 |

* cited by examiner

*Primary Examiner* — Gregory Binda
*Assistant Examiner* — Josh Skroupa
(74) *Attorney, Agent, or Firm* — David B. Kelley, Esq.; MacMillan, Sobanski & Todd, LLC

(57) ABSTRACT

A circuit for carrying hydraulic lubricant in a transmission includes a shaft including a duct, a second shaft separated by a space from the shaft, and including a second duct, and a cup plug including a leg that extends across the space, the leg and the second shaft forming a passage directed between an end of the leg and the space, and a cap having an orifice connecting the ducts.

19 Claims, 1 Drawing Sheet

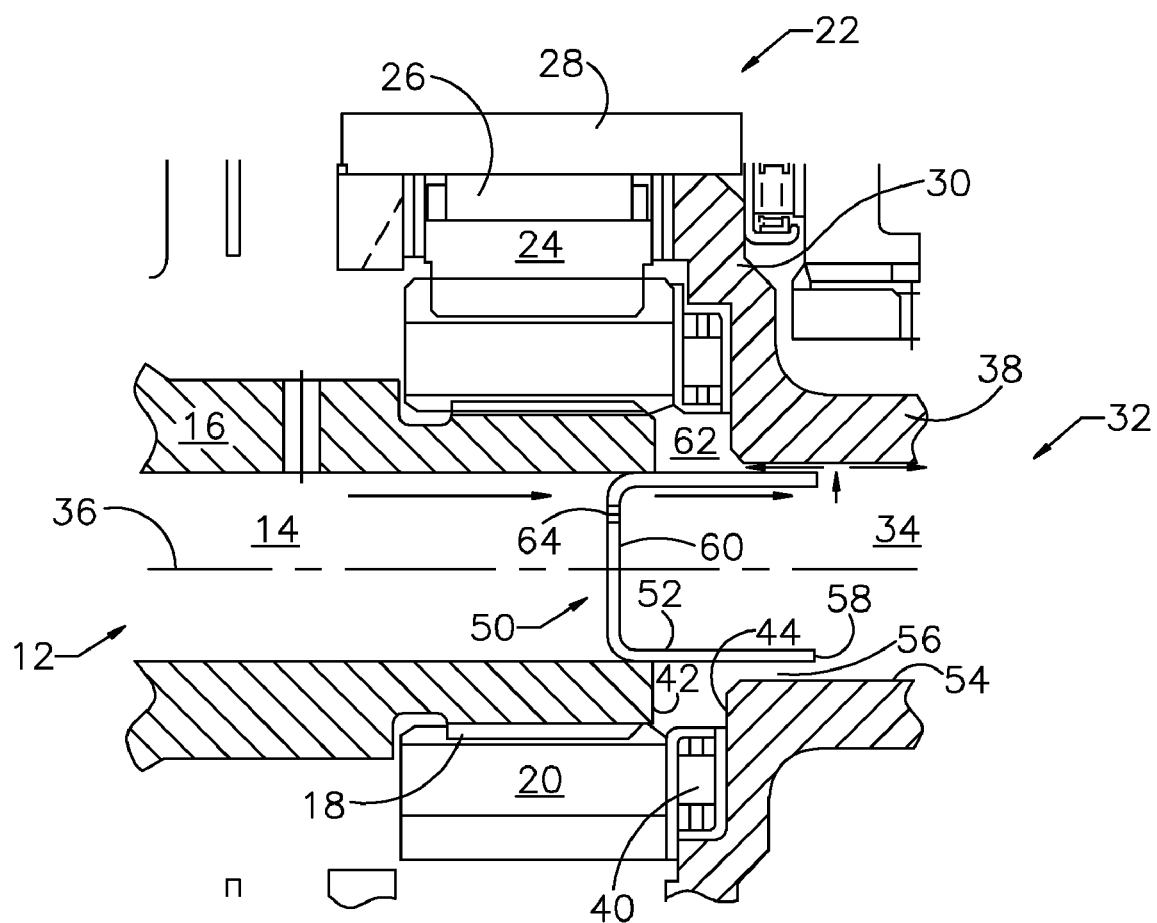

LUBRICANT CIRCUIT INCLUDING A CAP PLUG

BACKGROUND OF THE INVENTION

1. Field of the Invention

This invention relates generally to a motor vehicle transmission and particularly to a circuit for carrying lubrication to components of the transmission.

2. Description of the Prior Art

In motor vehicle transmissions it is difficult to properly distribute oil or automatic transmission fluid (ATF) to all the transmission components requiring lubrication when the rotational speed of the components is high or flow past thrust bearings is involved.

When the arrangement of components involves flow from one shaft to another and the flow requirements to a downstream shaft are considerably lower than those to an upstream shaft, a cup plug at the end of the first shaft with an orifice in it ensures that the right distribution of oil occurs, provided the orifice is sized to pass the appropriate amount of oil. In such a situation, if the oil flow exiting the cup plug orifice must pass a thrust bearing member, it is very difficult to guarantee that any oil will flow beyond that thrust bearing, especially if there is an end clearance gap at the bearing or the bearing is spinning at a relatively high speed.

One solution is to extend the upstream shaft into the downstream shaft, but this option is not always available. Adding tube deflectors to direct flow past a component to be lubricated, such as a bearing, involve additional parts and high cost.

SUMMARY OF THE INVENTION

A circuit for carrying hydraulic lubricant in a transmission includes a shaft including a duct, a second shaft separated by a space from the shaft, and including a second duct, and a cup plug including a leg that extends across the space, the leg and the second shaft forming a passage directed between an end of the leg and the space, and a cap having an orifice connecting the ducts.

The circuit components are inexpensive and easy to package in a transmission case. The circuit meters lubricant flow passing a point in the circuit, and directs lubricant to a desired location beyond an undesirable location using one component other than conventional transmission components.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which:

The FIGURE is a cross section taken at a diametric plane through the kinematic arrangement of an automatic transmission.

DESCRIPTION OF THE PREFERRED EMBODIMENT

The FIGURE shows a portion of a kinematic arrangement of an automatic transmission, which includes an upstream shaft 12 having with a longitudinal duct 14 containing a pressurized hydraulic lubricant such as ATF or oil. The wall 16 of shaft 12 is formed with an external spline 18, by which the shaft is secured to a gear 20, such as the sun gear of a planetary gear unit 22. A planet pinion 24 of the gear unit is supported for rotation by a bearing 26 on a pinion shaft 28, which is secured to a carrier 30.

A downstream shaft 32 having a longitudinal duct 34 is aligned with the axis 36 of shaft 12 and formed with a wall 38, which is integral with the carrier 30 of the gear unit 22.

A thrust bearing 40, located axially between the end face 42 of shaft 12 and the adjacent end face 44 of shaft 32, transmits axial force between sun gear 20 and shaft 32.

A cap plug 50, secured by a press fit in the duct 14 of shaft 12, includes an axial leg 52, which spans the space between the end faces 42, 44 of the shafts walls 16, 38. Leg 52 is spaced radially from the inner surface 54 of shaft 32, thereby defining a fluid passage 56 leading past the axial end 58 of leg 52 and toward thrust bearing 40. The cap 60 of plug 50 is formed with at least one orifice 64, through which ATF flows from duct 14 of the upstream shaft 12 to the duct 34 of downstream shaft 32.

As the arrows in the figure indicate, ATF exiting the orifice 64 flows downstream along the inner surface of leg 52 and over the end surface 58 of leg 52. A portion of that flow moves upstream along passage 56 through conduit 62 to bearing 40; another portion flows axially downstream along the inner surface 54 of shaft 32 to downstream components. Preferably orifice 64 is located eccentric of axis 36, such that centrifugal force facilitates flow of lubricant through the orifice as shaft 12 rotates.

Orifice 64 meters the flow rate of ATF passing through the orifice. The length of leg 52 extends axially and directs the lubricant downstream beyond thrust bearing 40 to allow oil to distribute more appropriately between the bearing 40 and components downstream.

Preferably plug 50 is formed of steel or aluminum although it can be formed of plastic. Its thickness is about 0.050 inches. The diameter of orifice 64 is established to produce a desired flow rate. The length to diameter ratio of plug 50 is usually greater than 1.0 and preferably about 1.5 or higher. The length of the plug's leg 52 is sufficient to retain the plug 50 by a press fit in shaft 12 and to span the space 62 between the adjacent shafts 12, 32.

In accordance with the provisions of the patent statutes, the preferred embodiment has been described. However, it should be noted that the alternate embodiments can be practiced otherwise than as specifically illustrated and described.

The invention claimed is:

1. A lubrication circuit, comprising:
   a shaft including a duct;
   a second shaft separated by a space from the shaft, and including a second duct;
   a plug located in the duct, including an orifice and a leg, the leg able to direct fluid in a first axial direction from the orifice, along the leg, past the space;
   a passage in the second duct, directing fluid in a second axial direction along the leg, to the space.

2. The circuit of claim 1, wherein the ducts are mutually aligned and the plug includes a cap forming a barrier between the ducts.

3. The circuit of claim 1, further comprising a component located in the space.

4. The circuit of claim 1, wherein the orifice restricts flow of lubricant between the ducts.

5. The circuit of claim 1, wherein an inner surface of the second duct directs lubricant away from a free end of the leg and toward the space.

6. The circuit of claim 1, wherein an inner surface of the second duct directs lubricant away from a free end of the leg.

7. The circuit of claim 1, wherein the plug includes a cap having an outer diameter and the leg has a length extending from the cap, and a ratio of the length and the diameter is greater than unity.

8. The circuit of claim 1, wherein the plug includes a cap having an outer diameter and the leg has a length extending from the cap, and a ratio of the length and the diameter is in a range between 1.0 and 2.5.

9. A lubrication circuit, comprising:
a shaft including a duct;
a second shaft able to rotate at a speed different from a speed of the shaft, separated by a space from the shaft, and including a second duct;
a plug connected by a press-fit to the duct, including an orifice, a leg directing fluid in a first axial direction from the orifice, along an inner surface of the leg, past the space, into the second duct;
a passage, directing fluid in a second axial direction, along the leg, into the space.

10. The circuit of claim 9, wherein the ducts are mutually aligned and the plug includes a cap forming a barrier between the ducts.

11. The circuit of claim 9, further comprising a component located in the space.

12. The circuit of claim 9, wherein an inner surface of the second duct directs lubricant away from a free end of the leg and toward the space.

13. The circuit of claim 9, wherein an inner surface of the second duct directs lubricant away from a free end of the leg.

14. The circuit of claim 9, wherein the plug includes a cap having an outer diameter and the leg has a length extending from the cap, and a ratio of the length and the diameter is greater than unity.

15. The circuit of claim 1, wherein the plug includes a cap having an outer diameter and the leg has a length extending from the cap, and a ratio of the length and the diameter is in a range between 1.0 and 2.0 2.5.

16. A lubricant circuit, comprising:
first and second shafts separated by a space;
a plug, including an orifice and a leg, the leg able to direct fluid in a first axial direction from the orifice, along an inner surface of the leg, past the space, across an axial end of the leg, in a second axial direction, along an outer surface of the leg, and into the space.

17. The circuit of claim 16, wherein the plug is secured to an inner surface of the shaft by a press-fit connection.

18. The circuit of claim 16, wherein a spline connection on the shaft and a bearing located between the shafts communicate hydraulically with the space.

19. The circuit of claim 16, further comprising a bearing located in the space.

* * * * *